(12) United States Patent
Goswami et al.

(10) Patent No.: US 11,188,798 B1
(45) Date of Patent: Nov. 30, 2021

(54) DETECTING ARTIFICIAL MULTIMEDIA CONTENT USING DEEP NETWORK RESPONSE ANALYSIS

(71) Applicant: International Business Machines Corporation, Armonk, NY (US)

(72) Inventors: Gaurav Goswami, Bangalore (IN); Nalini K. Ratha, Yorktown Heights, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/880,482

(22) Filed: May 21, 2020

(51) Int. Cl.
*G06K 9/62* (2006.01)
*G06N 3/04* (2006.01)
*G06N 3/08* (2006.01)

(52) U.S. Cl.
CPC .......... *G06K 9/627* (2013.01); *G06K 9/6256* (2013.01); *G06K 9/6262* (2013.01); *G06N 3/0454* (2013.01); *G06N 3/08* (2013.01)

(58) Field of Classification Search
CPC ...... G06K 9/627; G06K 9/6262; G06K 9/625; G06N 3/08; G06N 3/0454
USPC ........................................................ 382/156
See application file for complete search history.

(56) References Cited

U.S. PATENT DOCUMENTS

| | | | |
|---|---|---|---|
| 7,505,606 B2 | 3/2009 | Lin et al. | |
| 2018/0046712 A1 | 2/2018 | Henderson et al. | |
| 2019/0095946 A1 | 3/2019 | Azout et al. | |
| 2019/0171428 A1* | 6/2019 | Patton | G06N 20/00 |
| 2019/0213499 A1 | 7/2019 | Kita | |
| 2020/0335092 A1* | 10/2020 | Georgiou | G06N 20/00 |
| 2020/0372369 A1* | 11/2020 | Gong | G06N 3/0454 |

FOREIGN PATENT DOCUMENTS

CN 105913856 A 8/2016

OTHER PUBLICATIONS

David Guera and Edward J. Delp "Deepfake Video Detection Using Recurrent Neural Networks" Video and Image Processing Laboratory (VIPER), Purdue University retrieved Mar. 11, 2020.
Yuezun Li and Siwei Lyu "Exposing Deepfake Videos by Detecting Face Warping Artifacts" Computer Science Department University at Albany, State University of New York, USA retrieved Mar. 11, 2020.

(Continued)

*Primary Examiner* — Juan A Torres
(74) *Attorney, Agent, or Firm* — Harrinton & Smith

(57) ABSTRACT

Multiple trained AI models are tested using known genuine samples of respective multiple modalities of multimedia to generate versions of the multiple modalities of a given multimedia sample. Data for the multimedia and the multimedia sample are divided into the multiple modalities. Respective differences are computed between respective components of the multiple trained AI models to produce respective multiple difference vector, which are compared with corresponding baseline difference vectors determined in order to train the multiple trained AI models. The given multimedia sample is classified as genuine or altered using at least the comparison.

21 Claims, 8 Drawing Sheets

(56) References Cited

OTHER PUBLICATIONS

David Bau et al. "GAN Dissection: Visualizing and Understanding Generative Adversarial Networks" Massachusetts Institute of Technology, MIT-IBM Watson AI Lab, IBM Research, The Chinese University of Hong Kon retrieved Mar. 11, 2020.

Chengjiang Long, Arslan Basharat and Anthony Hoogs A Coarse-to-fine Deep Convolutional Neural Network Framework for Frame Duplication Detection and Localization in Forged Videos. Retrieved Mar. 11, 2020.

Shruti Agarwal et al.. "Protecting World Leaders Against Deep Fakes" University of California Berkeley and University of Southern California/USC Institute for Creative Technologies. Retrieved Mar. 11, 2020.

Janos Horvath et al. "Anomaly-Based Manipulation Detection in Satellite Images" Video and Image Processing Laboratory (VIPER), Purdue University, West Lafayette, IN, USA. Dipartimento di Informazione, Elettronica e Bioningegneria, Politecnico di Milano, Milan Italy. Retrieved Mar. 11, 2020.

Aurobrata Ghosh et al. "SpliceRadar: A Learned Method For Blind Image Forensics" retrieved Mar. 11, 2020.

Ekraam Sabir et al. "Recurrent Convolutional Strategies for Face Manipulation Detection in Videos" USC Information Sciences Institute, Marina del Rey, CA, USA retrieved Mar. 11, 2020.

Ehab A. Albadawy et al. "Detecting AI-Synthesized Speech Using Bispectral Analysis" University at Albany, SUNY, Albany NY, USA and University of California Berkley, Berkley CA, USA. retrieved Mar. 11, 2020.

Jamie Stanton et al. "Detecting Image Forgery Based on Color Phenomenology" University of Dayton. retrieved Mar. 11, 2020.

Ghazal Mazaheri et al. "A Skip Connection Architecture for Localization of Image Manipulations" University of California Riverside, retrieved Mar. 11, 2020.

Diangarti Bhalang Tariang "Classification of Computer Generated and Natural Images based on Efficient Deep Convolutional Recurrent Attention Model" retrieved Mar. 11, 2020.

Davide Cozzolino et al. "Extracting Camera-Based Fingerprints for Video Forensics" University Federico II of Naples. retrieved Mar. 11, 2020.

* cited by examiner

DETECTING ARTIFICIAL MULTIMEDIA CONTENT USING DEEP NETWORK RESPONSE ANALYSIS

BACKGROUND

This invention relates generally to multimedia content and, more specifically, relates to analysis of that content and use of the analysis.

Improvements in Artificial Intelligence (AI) that can generate realistic multimedia—images, videos, and text have enabled a variety of malicious applications such as creating fake news. A methodology for handling artificial multimedia content is essential in several use cases such as identifying and eliminating fake news, preventing ill effects caused by engineered media, and others.

The first step in addressing artificial multimedia is to be able to detect when elements of the media have signs of tampering. This is, however, not easily done.

SUMMARY

This section is meant to be exemplary and not meant to be limiting.

An exemplary embodiment is a method include testing multiple trained artificial intelligence models using known genuine samples of respective multiple modalities of multimedia to generate versions of the multiple modalities of a given multimedia sample. The data for the multimedia and the multimedia sample are divided into the multiple modalities. The method includes computing, based on the testing, respective differences between respective components of the multiple trained artificial intelligence models to produce respective multiple difference vectors. The method includes comparing the respective multiple difference vectors with corresponding baseline difference vectors determined in order to train the multiple trained artificial intelligence models. The method also includes classifying the given multimedia sample as genuine or altered using at least the comparison.

Another example is an apparatus. The apparatus includes one or more memories having computer-readable code thereon, and one or more processors. The one or more processors, in response to retrieval and execution of the computer-readable code, causing the apparatus to perform operations comprising: testing multiple trained artificial intelligence models using known genuine samples of respective multiple modalities of multimedia to generate versions of the multiple modalities of a given multimedia sample, wherein data for the multimedia and the multimedia sample are divided into the multiple modalities; computing, based on the testing, respective differences between respective components of the multiple trained artificial intelligence models to produce respective multiple difference vectors; comparing the respective multiple difference vectors with corresponding baseline difference vectors determined in order to train the multiple trained artificial intelligence models; and classifying the given multimedia sample as genuine or altered using at least the comparison.

A further exemplary embodiment is a computer program product. The computer program product includes a computer readable storage medium having program instructions embodied therewith. The program instructions are executable by an apparatus to cause the apparatus to perform at least the following: testing multiple trained artificial intelligence models using known genuine samples of respective multiple modalities of multimedia to generate versions of the multiple modalities of a given multimedia sample, wherein data for the multimedia and the multimedia sample are divided into the multiple modalities; computing, based on the testing, respective differences between respective components of the multiple trained artificial intelligence models to produce respective multiple difference vectors; comparing the respective multiple difference vectors with corresponding baseline difference vectors determined in order to train the multiple trained artificial intelligence models; and classifying the given multimedia sample as genuine or altered using at least the comparison.

DETAILED DESCRIPTION

Figure 1:
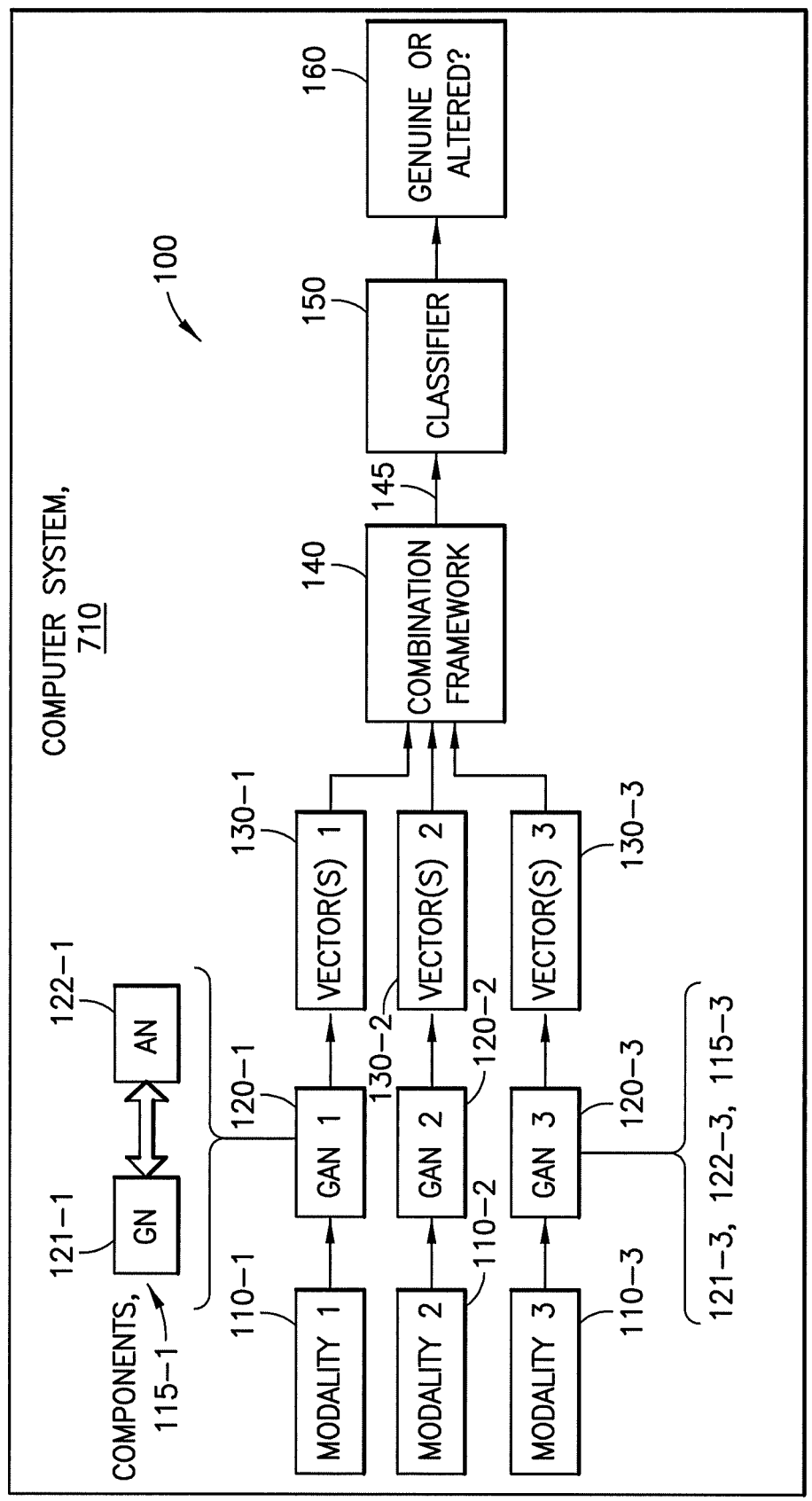
FIG. 1 is a block diagram of an overview of one proposed methodology in an exemplary embodiment.

The following abbreviations that may be found in the specification and/or the drawing figures are defined as follows:

AI Artificial Intelligence
AN Adversarial Network
CNN Convolutional Neural Network
GAN Generative Adversarial Network
GN Generative Network
LSTM Long Short-Term Memory
NN Neural Network
RNN Recurrent Neural Network The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As previously stated, there is a great demand and need for technology in detection of forged media. This media is referred to herein as artificial multimedia. Artificial multimedia is any multimedia that has been modified from an original version, often with the intention of being undetectable as artificial. The first step in addressing artificial multimedia is to be able to detect when elements of the media have signs of tampering. With the advancements in technologies such as generative adversarial networks, it has become increasingly easier to create convincingly forged media that is difficult to identify even upon human inspection, unless the observer has prior knowledge of the tampering.

In an exemplary embodiment, proposed methodology classifies each collection of related multimedia content as genuine or altered. For instance, an exemplary method leverages modality-specific representations and combines the representations at a high-level to predict if a set of multimedia is genuine or altered. These techniques may also enable further restorative/suppressive procedures to be applied on the altered multimedia content.

The approach is scalable to any number and/or kind of modalities. Further, the exemplary method works independent of particular types of alterations and is generalized. Performance on different alterations will depend on the manifestation of these alterations in the chosen individual representation space. Additionally, exemplary methods herein can be extended to problems beyond fake news detection, such as detecting poor quality media created for applications like data augmentation.

By contrast, existing approaches are either specific to only one modality, or specific to particular types of alterations or manipulations.

With respect to an exemplary embodiment, a combination of modality-specific network architectures is leveraged, along with a multi-modal aware combination framework, to extract discriminative features (e.g., as vectors) from a given set of related multimedia content. A classifier framework can use these features to categorize multimedia into genuine or altered categories. This classifier framework may be applied to static or sequence data (e.g., a set of static data in an order) by adapting the classifier strategy and algorithm as per the manifestation of the methodology.

This is illustrated in part by FIG. 1. Referring to FIG. 1, this figure is a block diagram of an overview of one proposed methodology 100 in an exemplary embodiment. The methodology 100 is implemented by a computer system 710 in an exemplary embodiment, and this computer system 710 is described in FIG. 7. There are three modalities 1 110-1, 2 110-2, and 3 110-3, each of which inputs to a corresponding GAN module 1 120-1, 120-2, and 120-3. Each modality 110 corresponds to a component of multimedia, such as voice or other audio, images, or video.

Before proceeding with additional description of the exemplary embodiments, it is helpful to define some terms. The term video as used herein is assumed to have an audio component and a visual component. The audio component could, for instance, be an audio channel, and the visual component could be a video channel. The audio component could be an audio signal, and the visual component could be a corresponding sequence of visual frames. Visual frames may also be referred to as video frames.

Returning to description of FIG. 1, each GAN module 120 produces a corresponding vector set 1 130-1, 2 130-2, and 3 130-3. Each vector set 130 can be considered to correspond to features of the corresponding GAN 120 that can then be used to distinguish between media. Thus, the vectors 130 are also referred to herein as feature vectors 130. Each GAN 120 could have multiple vectors, though these may also be combined into a single vector. For ease of reference, these are described herein as a single vector for each GAN 120, though this is not a limitation of the teachings herein. The vectors 130 correspond to components 115 for each of the GANs 120, and the components 115 correspond to certain (e.g., key) nodes and/or layers in the corresponding GAN 120. This is described in more detail below.

Concerning the GAN modules 120, a GAN module uses two different NNs, each pitted against the other. The two networks are the generative network (GN) 121 and the adversarial network (AN) 122, shown only for GAN module 1 120-1, although the other GAN modules 120-2 and 120-3 use similar structures. In the examples herein, the role of the adversarial network is limited to the training phase, where the adversarial network 122 tries to continuously force the generative network 121 to do better and create better images (or other elements, such as audio or video). For embodiments herein, the trained generative part of the network, illustrated as GN 121, is utilized and therefore represented as the "GAN module" 120.

The combination framework 140 operates on the vector sets 130 and forms discriminative vectors 145, which are unified vectors used by the classifier 150 to determine an output 160 of whether an input to the system is genuine or altered. This output 160 may be, e.g., from zero (e.g., genuine) to one (e.g., altered), e.g., or some value between these. The output may also be "genuine" or "altered" or the like, depending upon implementation.

With respect to the combination framework 140, there are multiple possible manifestations of this. In one manifestation, the combination framework 140 can be expressed as a weighted average of the independent feature vectors where the weights can be set at a modality-level or learned from training data. In another manifestation, the combination framework 140 may be a neural network that is trained alongside the final classifier or includes the classifier as a layer within its own architecture. In yet another manifestation, the combination framework 140 may rely on statistics or derived variables extracted from the independent feature vectors to compute the final feature vector. Additionally, one or more combination frameworks 140 may be combined to create an ensemble-based combination strategy.

While GANs and their corresponding neural networks are mainly described herein, the combination framework 140 and models 120 may involve any kind of artificial intelligence (AI) models or techniques. For instance, machine learning, deep learning, or natural language processing, or some combination of these, models and techniques might also be used. More specifically, to illustrate, convolutional and/or sequential autoencoders may be used to generate signatures for artificial multimedia, and techniques such as boosting or group sparse classifiers may be utilized to build the combination framework.

An exemplary proposed methodology is split into two training steps and three testing steps, although other number and types of steps may be used. This is illustrated by FIG. 1A, which is a flowchart of a training phase and testing phase, and which incorporates the block diagram of FIG. 1, in an exemplary embodiment.

Figure 1A:
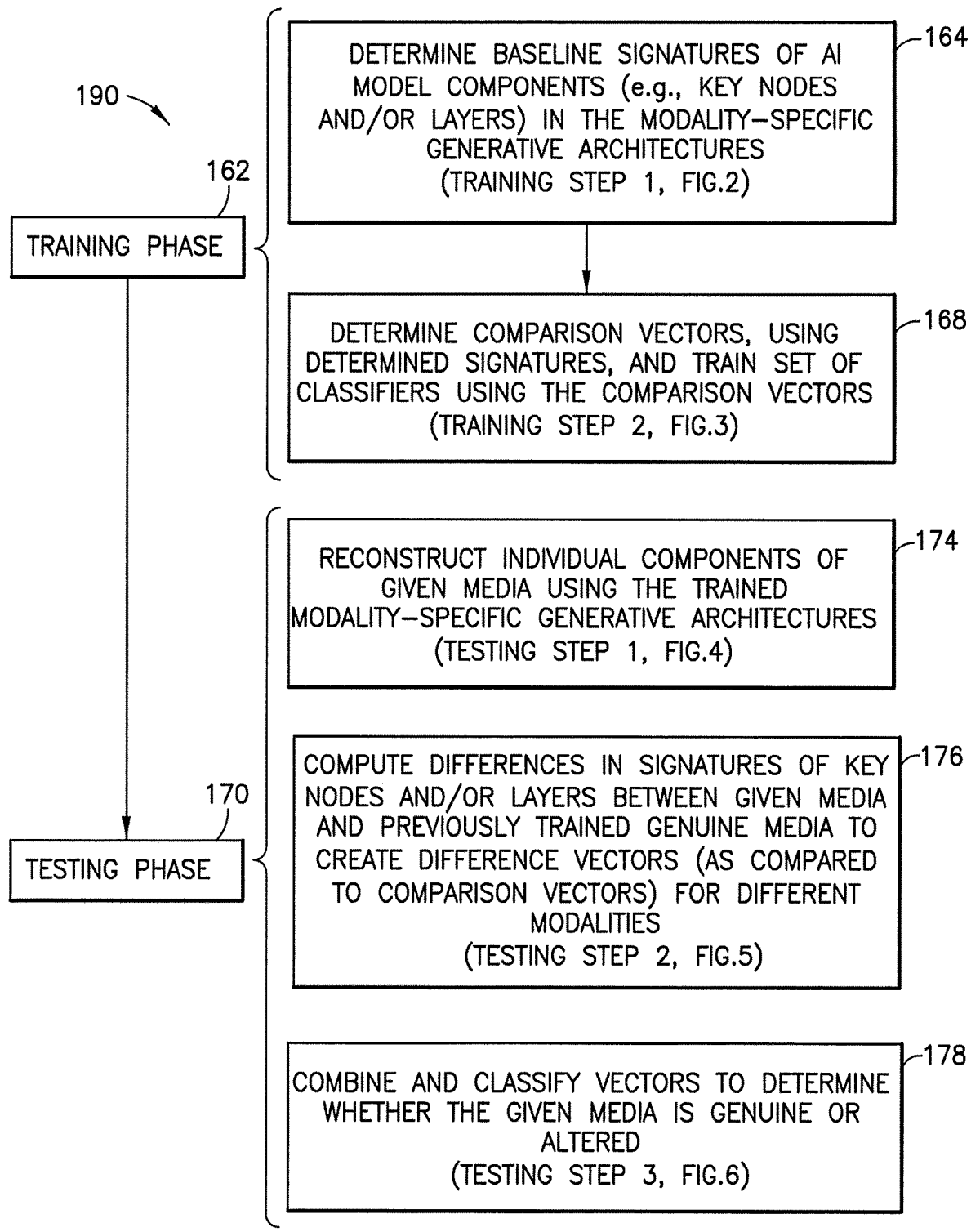
FIG. 1A is a flowchart of a process for artificial multimedia content detection in an exemplary embodiment, which is split into a training phase and testing phase and incorporates the methodology of FIG. 1.

In FIG. 1A, this shows a flowchart of a process 190 for artificial multimedia content detection in an exemplary embodiment, which is split into a training phase 162 and a testing phase 170. This process 190 may also be implemented by the computer system 710. The training phase 162 is used to train the elements in the methodology 100 and to create and train the classifier 150 that is then used in the testing phase 170.

Figure 2:
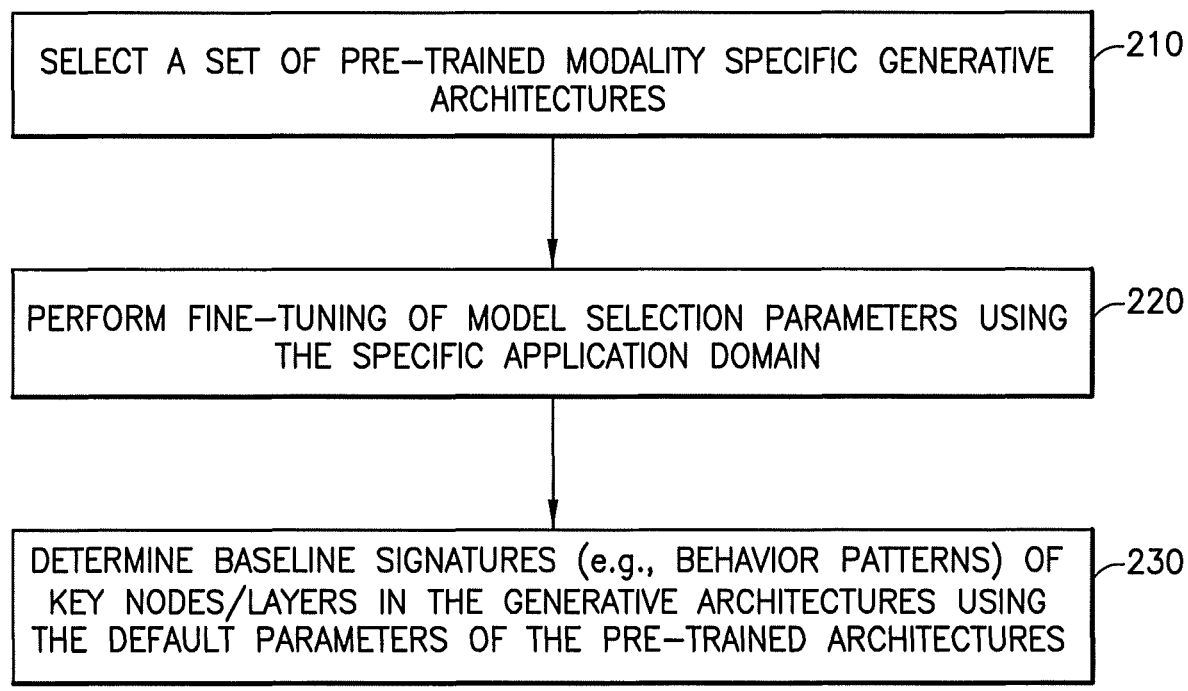
FIG. 2 is a block diagram of a method for performing a first training step, in accordance with an exemplary embodiment.

In block 164 of the training phase, the computer system 710 determines baseline signatures of AI (artificial intelligence) model components 115 (e.g., key nodes and/or layers) in the modality-specific generative architectures. The architectures are the GANs 120 in an example. The baseline signatures correspond to the components 115. One example of block 164 is referred to as training step 1, which is illustrated in FIG. 2.

Figure 3:
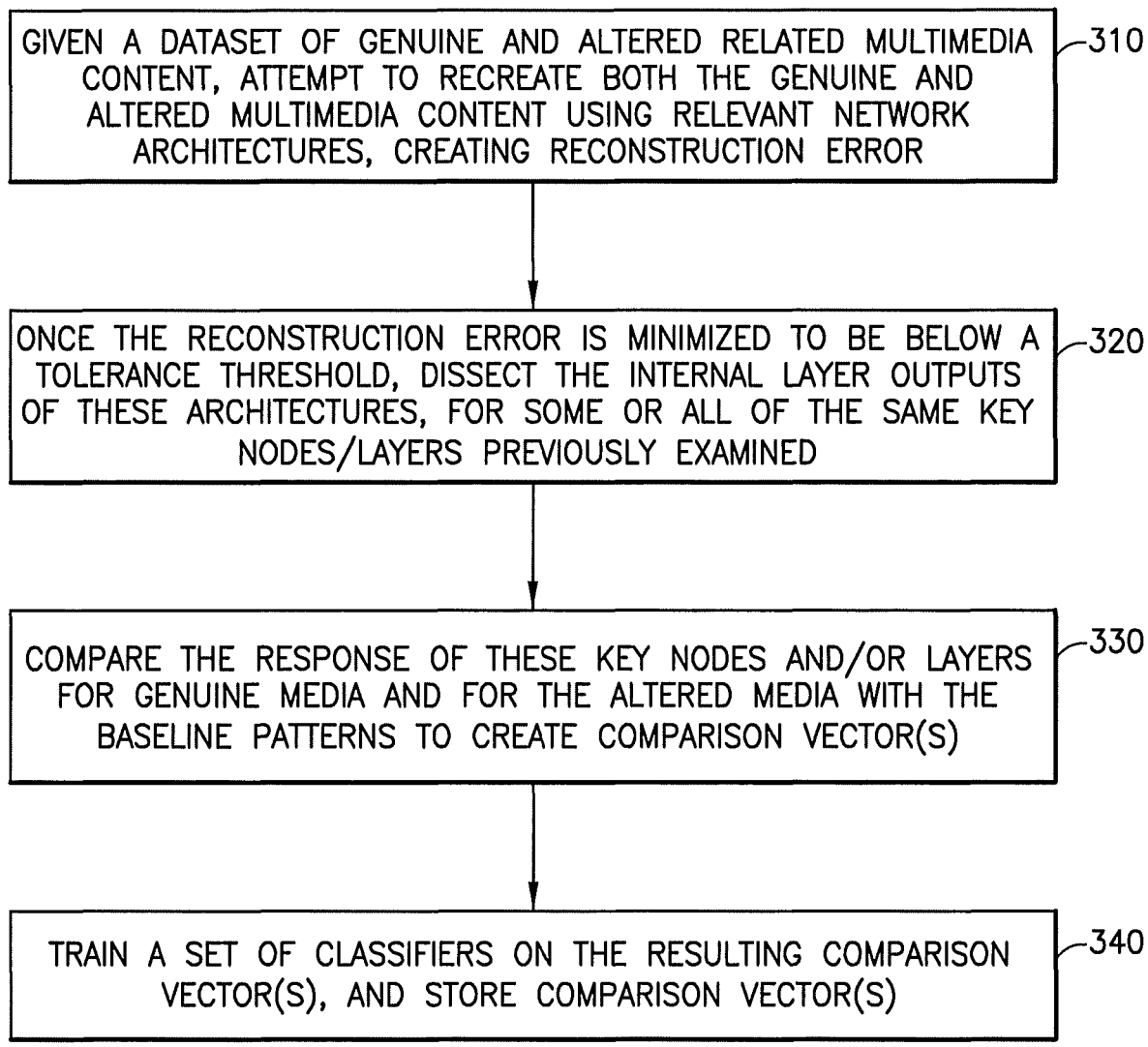
FIG. 3 is a block diagram of a method for performing a second training step, in accordance with an exemplary embodiment.

In block 168, the computer system 710 determine comparison vectors 130, using the determined signatures, and trains a set of classifiers 150 using the comparison vectors. While it is possible to keep each vector 130 for each modality 110 separate, and to perform an analysis based on these separate vectors, the examples herein combine the vectors 130 using the combination framework 140. This results in a set of classifiers 150, which may then be used to determine a resultant output 160 of genuine or altered. One example of block 168 is referred to as training step 2, and is illustrated by FIG. 3.

Once the training phase is complete, the testing phase 170 may then be used to determine whether a given sample of media is genuine or altered. The testing phase 170 is in the example of FIG. 1A split into three testing steps.

Figure 4:
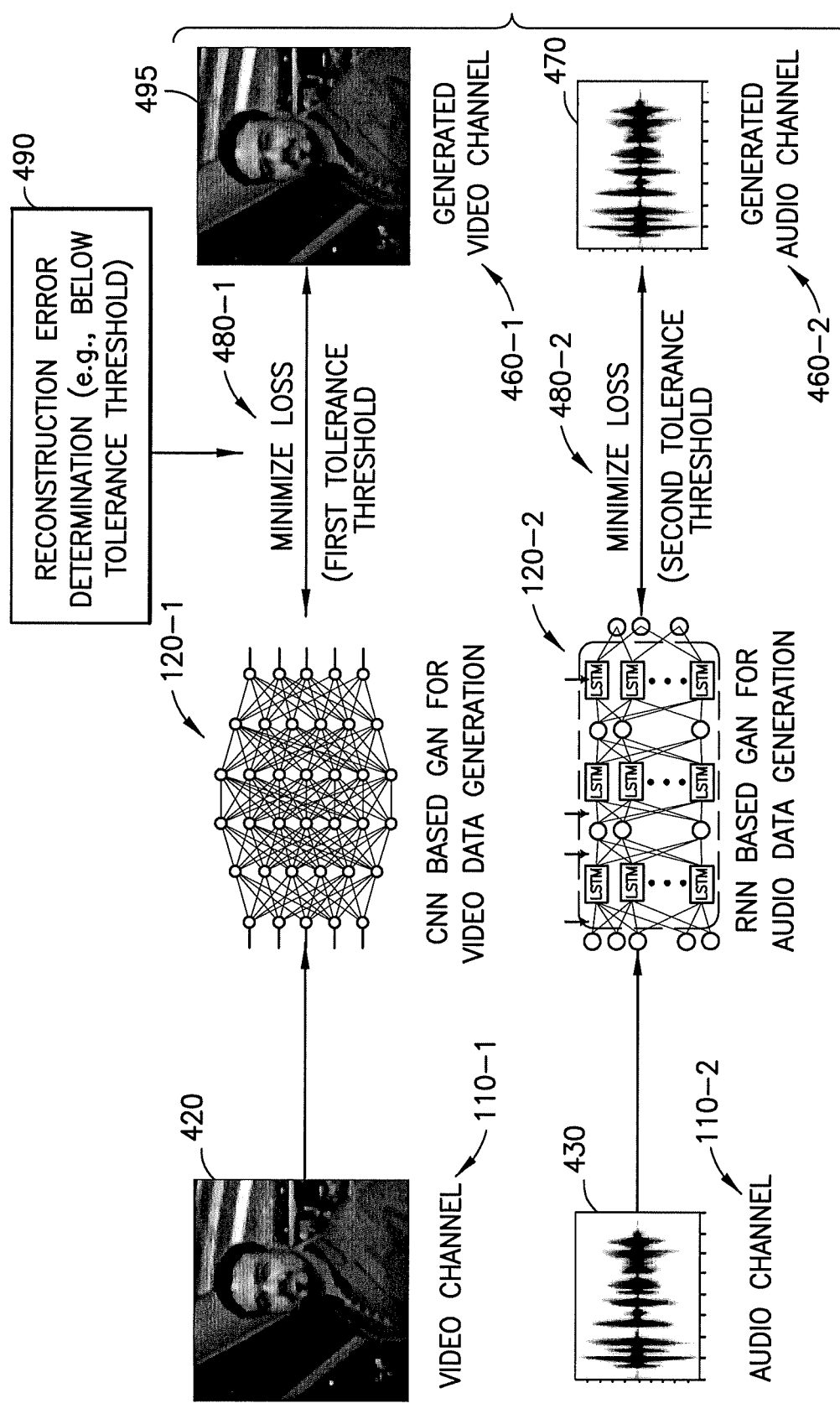
FIGS. 4, 5, and 6 are illustrations of different testing steps for an exemplary proposed methodology, in accordance with an exemplary embodiment.
Figure 5:
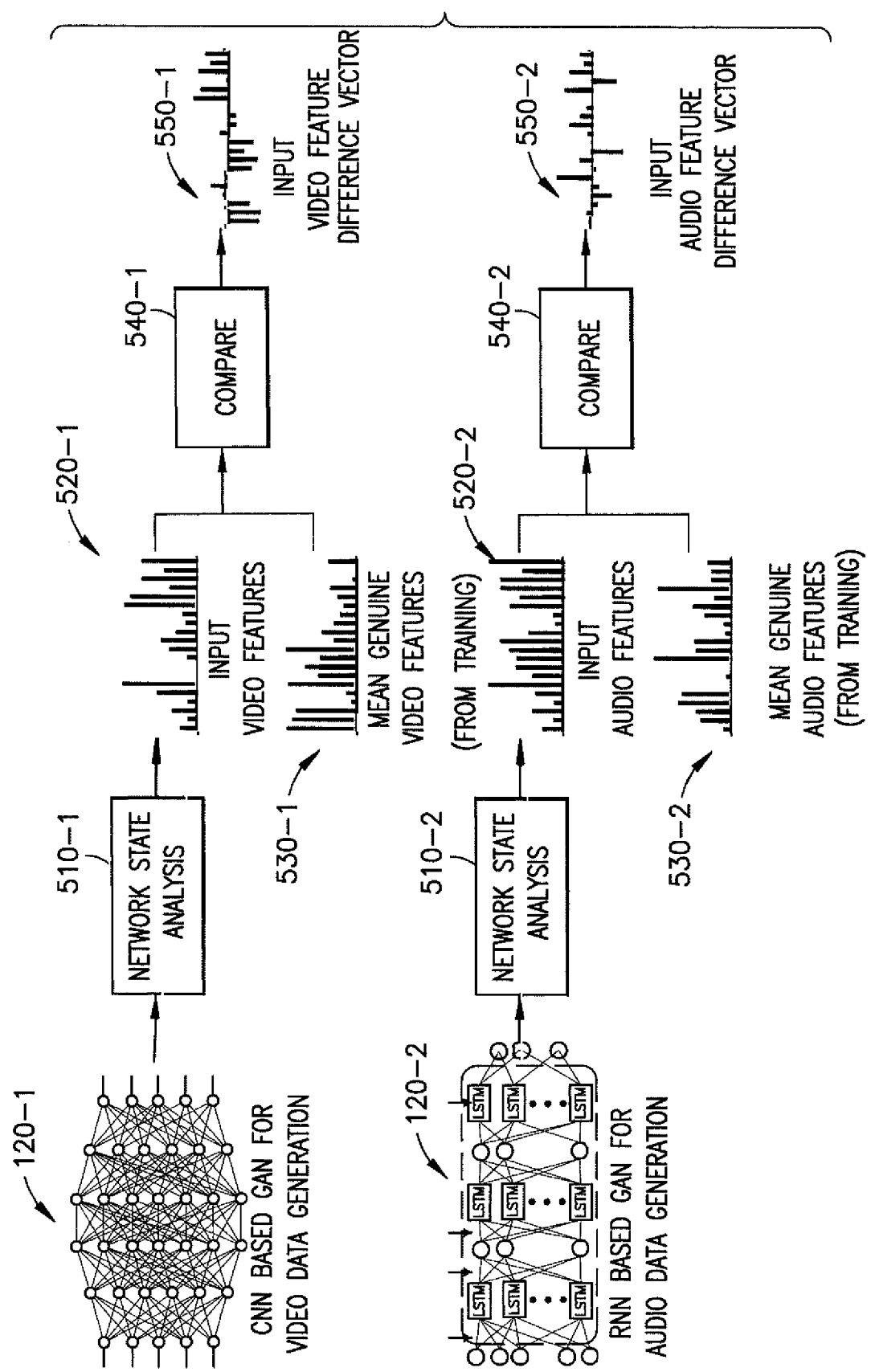

In block 174, the computer system 710 reconstructs individual components of a given media using the trained modality-specific generative architectures. The given media is a multimedia sample to be tested as either genuine or altered. This is testing step 1, one example of which is illustrated in FIG. 4. In block 176, the computer system 710 computes differences in signatures of AI model components 115 (e.g., key nodes and/or layers) between given media and previously trained genuine media to create difference vectors (as compared to comparison vectors) for different modalities. That is, the previously stored vectors 130 are compared with vectors 130 determined during the reconstruction using a given media. This is testing step 2, an example of which is illustrated in FIG. 5.

In block 178, the computer system 710 combines and classifies vectors to determine whether the given media is genuine or altered. This is testing step 3, illustrated in an example in FIG. 6.

Although the emphasis herein is placed on describing exemplary embodiments using a single given media for testing, it is possible to test multiple media. For instance, multiple media may be tested serially in an exemplary embodiment. In other words, it is possible to run the tests for multimedia (MM) 1, determine whether MM 1 is genuine/altered, run the tests for MM 2, determine whether MM 2 is genuine/altered, and this is repeated for each of the multiple media.

Now that an overview has been provided, more detail is provided.

Turning to FIG. 2, this is a block diagram of a method for performing a first training step, corresponding to block 164 of FIG. 1A, in accordance with an exemplary embodiment. In block 210, a set of pretrained modality-specific generative architectures (i.e., GAN modules 120) is selected. For instance, CNNs could be chosen for images or video frames, and RNNs might be chosen for audio or text. These are chosen from a pool of available generative architectures 120 that have been pretrained using other pertinent datasets. The term "other" is used here to indicate that, in this exemplary embodiment, the dataset(s) used for the testing process is not going to be used for the process in FIG. 2. The other pertinent dataset(s) can be other different dataset(s) that need not be a part of the current dataset(s) or similar data to which the algorithm for evaluation/inference will be applied. The dataset is pertinent to the modality 110, such as images, audio, video, or the like.

As additional detail, the selection of the appropriate GAN architectures may include selection of the number and type of layers, how they are connected, what loss function and hyperparameters to use, and the like. The selection is based on the type of fake multimedia that will be detected. For example, if one wants to verify the organic (i.e., genuine) authenticity of videos that primarily deal with people talking/giving interviews, it is possible to select GAN architectures that are shown to have high performance in generating human speech and human face images.

Then, these architectures (e.g., just the skeletons) of these modality-specific GANs are used, and potentially also their pre-trained weights (e.g., which are a result of training using open source datasets that they report their performance on). Optionally, if possible, one may want to fine-tune (e.g., take the existing weights and tweak them using other database(s)) them, using more task-specific databases if available.

For example, fine-tuning model selection parameters using the specific application domain may be used to further refine the set of chosen architectures to best suit the domain. See block 220. This is because certain architectures work better for a given type of data than others. For example, as described above, CNNs might work better (e.g., relative to RNNs) for images or video frames, and RNNs might work better (e.g., relative to CNNs) for audio or text.

Using the default parameters of the pretrained network, the baseline behavior patterns (also referred to as signatures) of key nodes/layers may be determined in the generative architectures. See block 230. The terms "behavior pattern" and "signature" are used interchangeably, and each of these is what is referred to as the vector(s) of the activation state(s) of each key node/layer in the network. Key nodes and/or layers can be determined for each architecture independently, e.g., by observing which of them showcase consistently high contribution (e.g., high activation) when the architecture generates synthetic images (as an example of a modality 110) with desired properties. The desired properties can be defined based on the task and domain of the media.

In more detail, perform GAN analysis/dissection may be performed using methodologies that can help quantify the contribution of different layers/nodes in the respective GANs when these networks generate their best output. This is effectively training step 1, where it is learned how the GANs behave. One aim of this first training step is to learn the most important components of each GAN. In an example case presented below, there are two modalities 110 (a visual component and an audio component of video) and therefore two GANs 120 that will be used to perform this step. Once these components 115 and their corresponding signatures are determined for each GAN, this concludes training step 1.

Turning to FIG. 3, this figure is a block diagram of a method for performing a second training step (see block 168 of FIG. 1A), in accordance with an exemplary embodiment. This method is performed after the method in FIG. 2 has been performed.

Now, since it is known which components (layers/nodes) are important in each GAN, one can begin applying them to reconstruct (e.g., in the image space) organic (i.e., genuine) and synthetic (i.e., altered) samples that closely resemble the target use case. In one example, it would be organic videos and synthetic videos (e.g., where synthetic videos may be generated using the organic videos and computer vision/speech processing techniques). Even a relatively small number of labeled videos should be suitable (where "labeled" means the video is labeled as either genuine or synthetic).

In block 310, given a dataset of genuine and altered related multimedia content, where the ith sample of n related media items from a dataset is denoted as $\{m_{i1}, m_{i2}, \ldots, m_{in}\}$, an attempt is made to recreate both the genuine and altered multimedia content using relevant network architectures, such as the GANs 120 that have been selected for the corresponding modalities. For instance, as previously described, CNNs could be chosen for images or video frames, and RNNs might be chosen for audio or text. This attempt creates a reconstruction error.

In additional detail, the ith notation denotes one sample from the dataset where each sample contains n media items. If the example is video, then n=2 (i.e., an audio component and a visual component) and in a dataset of 100 such media, the value i can range from 0 to 99. Each item will have i1 and i2, denoting the video and audio components (the two related media items) of that particular video in the dataset.

The recreation will never be exact and have some recreation (also termed reconstruction) error. While one can try to reduce the error below a tolerance/threshold, in many cases, there will typically not be zero error. Therefore, block 310 says that there is an "attempt" to create the best recreation that can be recreated.

The relevant network architectures are modality-specific relevant GAN modules 120. A GAN module 120 trained on images might not be useful to reconstruct a sound signal, for example, and vice versa.

Additional training data for the altered class may be generated using fake generation techniques and/or creating deliberately tampered data using media-specific methods. For instance, mis-syncing the audio track of a video by different offsets can generate different altered versions of the same video.

As samples are reconstructed using these GANs, monitoring and recording is performed of the behavior of the components 115 (e.g., key nodes/layers) and the pattern(s) (as vector(s) 130) that exist in the differences between their behavior on organic and synthetic samples become the feature vectors 130. The reason this is performed for these components 115 and not for all nodes/layers in the network is to keep the feature dimension reasonably low and high impact. For example, if it is observed that nodes 50-100 in layer 3 and nodes 25, 26, and 27 in layer 5 are consistently taking different value ranges when attempts are made to reconstruct organic videos with the GAN versus synthetic videos, then these can be arranged as a vector in a fixed sequence and made one of the feature vectors. In an exemplary embodiment, this observation is by a human but computed and identified programmatically—such as by a python script or other programming. It is also possible for this to be entirely In light of this, in block 320, once the reconstruction error is minimized to be below (e.g., meet) a tolerance threshold, the internal layer outputs of these architectures are dissected. In particular, the dissection views at least some or all of the same key nodes/layers as in block 230. In an exemplary embodiment, the determination of the components (e.g., key nodes/layers) may be based on the ranking of components, which is based on how often the components take larger values (e.g., high activation means high contribution to the final result) when the generative network outputs a good quality (e.g., very realistic) synthetic result.

In block 330, the response of these key nodes and/or layers are compared for genuine media and for the altered media with the baseline patterns. This operation creates comparison vector(s).

Once the feature vectors are in place, one can combine them using a combination framework. This can be implemented in different ways, such as concatenation, using a deep/shallow neural network, and/or using fusion or other techniques. This obtains a final vector for the multimedia content. This final vector is, in an exemplary embodiment below, considered to be a mean genuine feature vector. After combination, in block 340, a set of classifiers are trained on the resulting comparison vector(s). Any type of classifier may be trained on top of the feature vectors 130.

To generate the feature vectors 130 for test-time content, such as a multimedia sample to be tested as being genuine or altered, the mean organic (genuine) media response is stored (see block 34) as reference feature vectors 130 for future usage. This is GAN-specific, so in in the example case presented below, there will be two sets of this, one set for an audio component and one set for a visual component. This concludes training step 2.

At this point, the training phase 162 has been described. Once the training phase is complete, the testing phase may be performed. As an overview, during testing, stored classifiers are leveraged, and the steps as illustrated in the testing phase are repeated, but using a given multimedia sample. The given multimedia sample is reconstructed. During this process, the behavior of the components 115, e.g., the key nodes/layers for the corresponding GANs 120 is recorded. The behavior is compared with the mean recorded behavior for each GAN that was stored after training step 2. A difference vector is obtained, this is passed to the trained classifier 150, and the output 160 that denotes whether a particular modality is detected as synthetic (i.e., genuine) or altered is determined. This concludes the flow of the overall algorithm from training to testing.

With respect to testing, FIG. 4 is an illustration of a first testing step, see also block 174 of FIG. 1A, which is where the computer system 710 reconstructs individual components of a given media using the trained modality-specific generative architectures. That is, this figure illustrates reconstruction of individual components of the given multimedia sample 410, which is a video having a visual component of the video channel 110-1 and an audio component of the audio channel 110-2. This reconstruction is performed such that a reconstruction error (e.g., such as perceptual loss) is below the tolerance threshold. See block 490. Here, the modality-specific architectures of the GANs 120-1 and 120-2 are leveraged in order to perform the best reconstruction. Beyond modality, generative architectures may be fine-tuned further for the specific type of data, e.g., faces versus landscapes so that the optimization process is more efficient. This has been previously described.

In FIG. 4, a multimedia sample 410 is provided, and this has two modalities 110-1, a video channel, and 110-2, an audio channel. As an overview and for an exemplary embodiment, this uses the generative network of the selected GAN architecture and minimizes the perceptual (in a corresponding image/visual space) error between a generated image and an original image. Similar functions are performed for the audio.

An example of an image of the video channel is illustrated as reference 420, and an example of a portion of audio of the audio channel is illustrated as reference 430. In this example, the GAN 120-1 is a CNN-based GAN for visual data generation, and the GAN 120-2 is an RNN-based GAN for audio data generation. It is noted that the RNN-based GAN 120-2 has Long Short-Term Memory (LSTM) cells as part of the network. The computer system 710 attempts to reconstruct the multimedia sample 410 by generating the video channel 460-1 (one part of which is illustrated by reference 495) and generating the audio channel 460-2 (one part of which is illustrated by reference 470). A metric is used for each of these to determine how well the generated version 460-1, 460-2 corresponds to the versions 110-1, 110-2 in the sample 410. In this example, the computer system 710 performs a reconstruction error determination 490 to minimize loss 480-1 for the video channel (e.g., using a first tolerance threshold) and to minimize loss 480-2 for the audio channel (e.g., using a second tolerance threshold).

Turning to FIG. 5, this is an example of a second testing step. See block 176 of FIG. 1A, where the computer system 710 computes differences in signatures of AI model components 115 (e.g., key nodes and/or layers) between given media and previously trained genuine media to create difference vectors (as compared to comparison vectors) for different modalities. That is, the previously stored vectors 130 are compared with vectors 130 determined during the reconstruction using a given media.

For FIG. 5, the difference is determined in the signatures of the AI model components (e.g., the most prominent layers and/or nodes) in the generative architectures (e.g., GANs 120) between the given multimedia sample(s) and previously processed genuine/unaltered samples. This can be seen as the network state analysis 510-1 of the GAN 120-1 for video data generation, which results in input video feature vector 520-1 comprising input audio features. The input video feature vector 520-1 is an example of a (e.g., testing/input) feature vector 130. This can also be seen as the network state analysis 510-2 of the GAN 120-2 for audio data generation, which results in input audio feature vector 520-2 comprising input audio features. The input audio feature vector 520-2 is an example of a (e.g., testing/input) feature vector 130. Each network state analysis 510 is a combination that uses corresponding ones of the signatures learned during training (e.g., see block 164 of FIG. 1A) and the network state obtained after the reconstruction showed in FIG. 4.

The differences may be computed using various methods and a difference vector 550 is created for each modality. Specifically, the input video feature vector 520-1 is compared (block 540-1) with a previously stored feature vector 130, shown as a mean genuine video feature vector 530-1 from training. Mean genuine feature vectors 530 are one exemplary output of step 168 of FIG. 1A. The comparison results in the input video features difference vector 550-1. The input audio feature vector 520-2 is compared (block 540-2) with a previously stored feature vector 130, shown as a mean genuine audio feature vector 530-2 from training. The comparison results in the input audio features difference vector 550-2.

Figure 6:
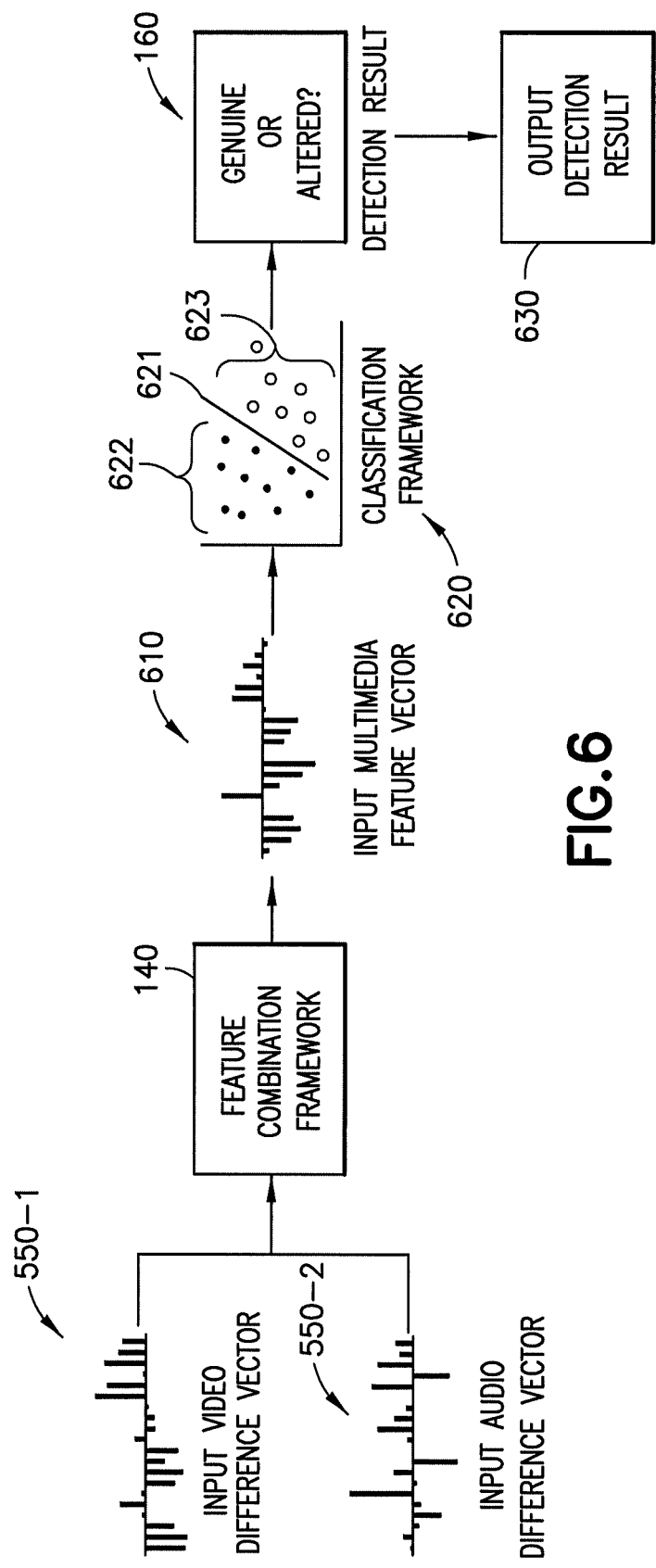

Turning to FIG. 6, this is an example of a third testing step, where a computer system 710 combines and classifies vectors to determine whether the given media is genuine or altered. In FIG. 6, the two difference vectors 550-1, 550-2 of independent modalities are passed to the combination framework 140. The combination framework 140 provides a unified feature vector, shown as input multimedia feature vector 610, for the entire set. The classification framework 620 classifies the sample set as genuine/altered 160 using the trained classifier 150 (see FIG. 1). This example shows a two-dimensional space where feature vectors mapped into the area 622 are considered to be altered, whereas feature vectors mapped into the area 623 are considered to be genuine, and the line 621 distinguishes between the two spaces 622, 623. Note that this is for ease of exposition only, as normal feature vectors would be N-dimensional, where N is typically greater than two. This detection result 160 is output in block 630, which may be output to a network and/or a display, for instance. The output in block 630 may take many forms, such as an integer (e.g., zero=genuine, one=altered), a real number (e.g., values under 0.5 are genuine, values about 0.5 are altered), text (e.g., "genuine" or "altered") or the like.

Figure 7:
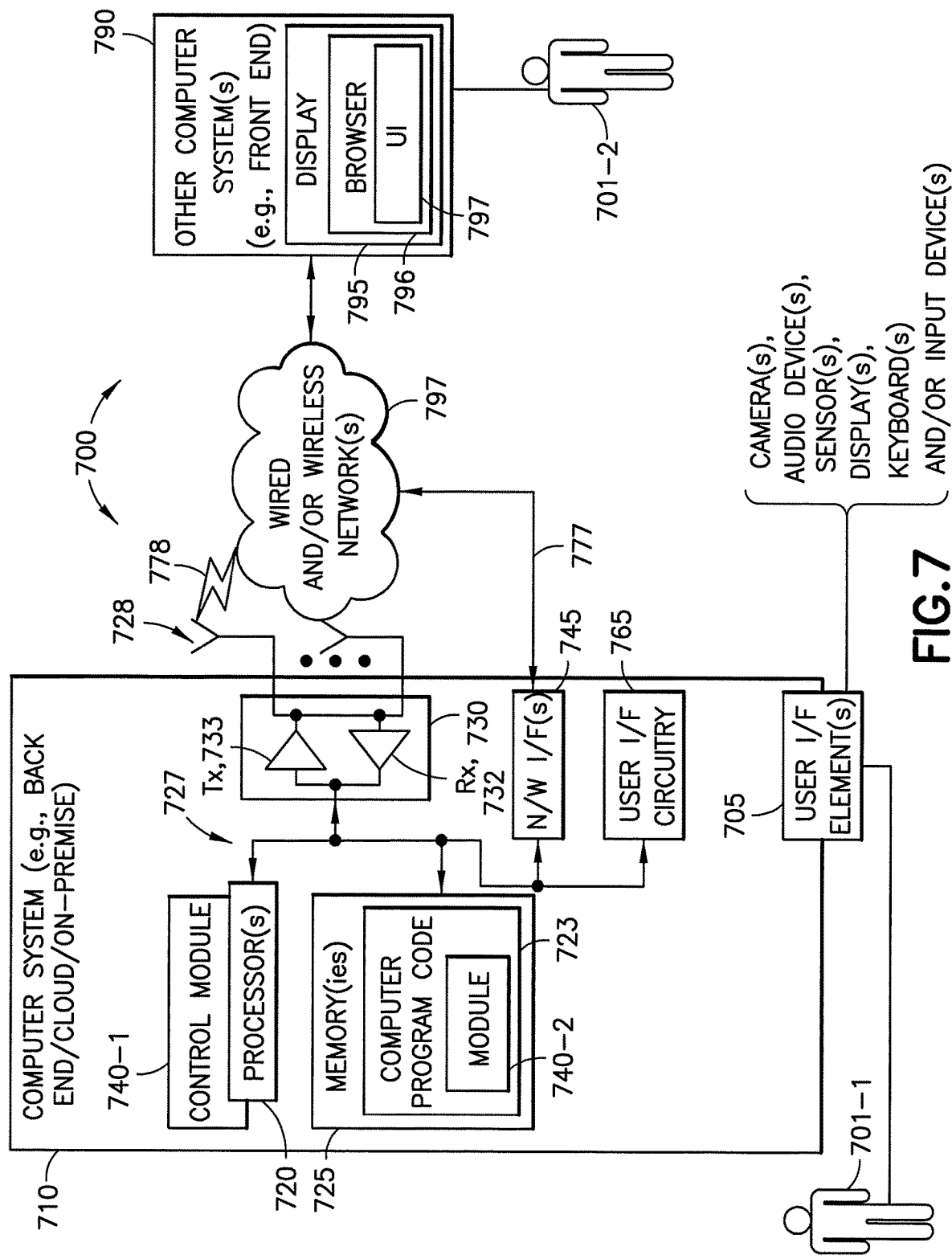
FIG. 7 is a block diagram of a system in which the exemplary embodiments may be practice, in accordance with an exemplary embodiment.

Turning to FIG. 7, this figure is an example of systems 700 in which the exemplary embodiments might be practiced. The computer system 710 comprises the following: one or more processors 720; one or more memories 725; network (N/W) interface(s) (I/F(s)) 745, one or more transceivers 730 having one or more antennas 728, and user interface (I/F) circuitry 765, all interconnected through one or more buses 727. The computer system 710 may also include one or more user I/F elements 705, such as camera (s), audio device(s), sensor(s), display(s), keyboard(s), and/ or other input device(s) (such as trackballs, mice, touch screens, and the like). The one or more transceivers 730 include a receiver (Rx) 732 and a transmitter (Tx) 733.

The one or more buses 727 may be address, data, or control buses, and may include any interconnection mechanism, such as a series of lines on a motherboard or integrated circuit, fiber optics or other optical communication equipment, and the like. The one or more memories 725 include computer program code 723. The computer system 710 includes a control module 740, comprising one of or both parts 740-1 and/or 740-2, which may be implemented in a number of ways. The control module 740 implements the detecting artificial multimedia content using deep network response analysis as previously described. The control module 740 may be implemented in hardware as control module 740-1, such as being implemented as part of the one or more processors 720. The control module 740-1 may be implemented also as an integrated circuit or through other hardware such as a programmable gate array. In another example, the control module 740 may be implemented as control module 740-2, which is implemented as computer program code 723 and is executed by the one or more processors 720. For instance, the one or more memories 725 and the computer program code 723 may be configured to, with the one or more processors 720, cause the computer system 710 to perform one or more of the operations as described herein.

The computer system 710 may communicate with one or more wired and/or wireless networks via one or both of wireless link 778 or wired link 777. Another computer system 790 may also be used, comprising a display 795, a browser 796, and a UI 797. Users 701 may interact with one or both of the computer system 710 (user 701-1) or computer system 790 (user 701-2).

In one example, the computer system 710 is an on-premise computer system, where a user 710-1 is on the same premises as the computer system 710. The computer system 710 can communicate with internal and external networks 797. In another example, the entire system 700 may be on-premises, such that a user 701-2 uses a front-end computer system 790 to connect via the network(s) 797 with a back-end computer system 710. The back-end computer system 710 has the control module 740 that implements the detecting artificial multimedia content using deep network response analysis, and creates output to display the UI 797 (e.g., within the browser 796) on the display 795.

As another example, the system 700 may be in separate locations, and the user 701-2 can connect via the one or more networks 797 (e.g., the Internet) to the computer system 710, which then has the control module 740 that implements the detecting artificial multimedia content using deep network response analysis, and creates output to display the UI 797 on the display 795. The computer system 710 may be implemented in the cloud for instance, and the visualization could be offered as a service. The computer system 710 could also be a server and the computer system 790 a client, as another example of a possible implementation.

There is a great demand and need for technology in detection of forged media, and the instant techniques help with detection of this media. The techniques herein can be extended to problems beyond fake news detection—such as detecting poor quality media created for applications like data augmentation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    testing multiple trained artificial intelligence models using known genuine samples of respective multiple modalities of multimedia to generate versions of the multiple modalities of a given multimedia sample, wherein data for the multimedia and the multimedia sample are divided into the multiple modalities;
    computing, based on the testing, respective differences between respective components of the multiple trained artificial intelligence models to produce respective multiple difference vectors;
    comparing the respective multiple difference vectors with corresponding baseline difference vectors determined in order to train the multiple trained artificial intelligence models; and
    classifying the given multimedia sample as genuine or altered using at least the comparison.

2. The method of claim 1, wherein the multiple trained artificial intelligence models comprise first and second trained artificial intelligence models and the method further comprises:
    training a first type of artificial intelligence system for a first modality of media to produce the first trained artificial intelligence model; and
    training a second type of artificial intelligence system for a second modality of media to produce the second trained artificial intelligence model.

3. The method of claim 1, wherein a first of the multiple modalities comprises visual media and a convolutional neural network is used as the artificial intelligence model for this modality, and a second of the multiple modalities comprises audio or text and a recurrent neural network is used as the artificial intelligence model for this modality.

4. The method of claim 1, wherein the testing multiple trained artificial intelligence models further comprises recreating, using a dataset of genuine and altered multimedia content, both the genuine and altered multimedia content using respective first and second type of trained artificial intelligence models, the recreating performed until respective reconstruction errors meet respective tolerance thresholds.

5. The method of claim 1, further comprising outputting indication of the classification of the given multimedia sample as genuine or altered.

6. The method of claim 2, further comprising adjusting model selection parameters for the first and second trained artificial intelligence models using parameters specific to individual domains into which data for a respective modality falls, in order to determine which architectures work better for types of data in the modalities than other architectures for those types of data.

7. The method of claim 2, further comprising using the first and second trained artificial intelligence models on first and second difference vectors, formed using corresponding components during respective training of the first and second types of artificial intelligence systems, to create a combination framework, wherein the combination network forms unified vectors from the first and second difference vectors.

8. The method of claim 4, wherein:
    the comparing further comprises comparing respective multiple difference vectors with corresponding baseline difference vectors that are mean vectors for respective modalities determined during training, and the comparing creates input difference vectors for respective modalities; and
    the classifying further comprises combining the input difference vectors for respective modalities into a unified input vector and classifying the unified input vector as genuine or altered using a classification framework that classifies based on unified difference vectors.

9. The method of claim 7, further comprising recreating, using a dataset of genuine and altered multimedia content, both the genuine and altered multimedia content using respective first and second type of artificial intelligence systems, the recreating performed until respective reconstruction errors meet respective tolerance thresholds.

10. The method of claim 9, further comprising:
    dissecting, after the reconstruction, internal layer outputs of the first and second trained artificial intelligence models to determine which components of the models to use to create respective difference vectors, wherein the components comprise one or more of nodes or layers in respective models;
    comparing first and second difference vectors for the components in the respective first and second trained artificial intelligence models for genuine and altered multimedia content; and
    deriving a set of classifiers from the first and second difference vectors based on the genuine and altered multimedia content.

11. An apparatus, comprising:
    one or more memories having computer-readable code thereon; and
    one or more processors, the one or more processors, in response to retrieval and execution of the computer-readable code, causing the apparatus to perform operations comprising:
    testing multiple trained artificial intelligence models using known genuine samples of respective multiple modalities of multimedia to generate versions of the multiple modalities of a given multimedia sample, wherein data for the multimedia and the multimedia sample are divided into the multiple modalities;
    computing, based on the testing, respective differences between respective components of the multiple trained artificial intelligence models to produce respective multiple difference vectors;
    comparing the respective multiple difference vectors with corresponding baseline difference vectors determined in order to train the multiple trained artificial intelligence models; and
    classifying the given multimedia sample as genuine or altered using at least the comparison.

12. The apparatus of claim 11, wherein the multiple trained artificial intelligence models comprise first and second trained artificial intelligence models and wherein the one or more processors, in response to retrieval and execution of the computer-readable code, further cause the apparatus to perform operations comprising:
    training a first type of artificial intelligence system for a first modality of media to produce the first trained artificial intelligence model; and
    training a second type of artificial intelligence system for a second modality of media to produce the second trained artificial intelligence model.

13. The apparatus of claim 11, wherein a first of the multiple modalities comprises visual media and a convolutional neural network is used as the artificial intelligence model for this modality, and a second of the multiple modalities comprises audio or text and a recurrent neural network is used as the artificial intelligence model for this modality.

14. The apparatus of claim 11, wherein the testing multiple trained artificial intelligence models further comprises recreating, using a dataset of genuine and altered multimedia content, both the genuine and altered multimedia content using respective first and second type of trained artificial intelligence models, the recreating performed until respective reconstruction errors meet respective tolerance thresholds.

15. The apparatus of claim 11, wherein the one or more processors, in response to retrieval and execution of the computer-readable code, further cause the apparatus to perform operations comprising: outputting indication of the classification of the given multimedia sample as genuine or altered.

16. The apparatus of claim 12, wherein the one or more processors, in response to retrieval and execution of the computer-readable code, further cause the apparatus to perform operations comprising: adjusting model selection parameters for the first and second trained artificial intelligence models using parameters specific to individual domains into which data for a respective modality falls, in order to determine which architectures work better for types of data in the modalities than other architectures for those types of data.

17. The apparatus of claim 12, wherein the one or more processors, in response to retrieval and execution of the computer-readable code, further cause the apparatus to perform operations comprising: using the first and second trained artificial intelligence models on first and second difference vectors, formed using corresponding components during respective training of the first and second types of artificial intelligence systems, to create a combination framework, wherein the combination network forms unified vectors from the first and second difference vectors.

18. The apparatus of claim 14, wherein:
the comparing further comprises comparing respective multiple difference vectors with corresponding baseline difference vectors that are mean vectors for respective modalities determined during training, and the comparing creates input difference vectors for respective modalities; and
the classifying further comprises combining the input difference vectors for respective modalities into a unified input vector and classifying the unified input vector as genuine or altered using a classification framework that classifies based on unified difference vectors.

19. The apparatus of claim 17, wherein the one or more processors, in response to retrieval and execution of the computer-readable code, further cause the apparatus to perform operations comprising: recreating, using a dataset of genuine and altered multimedia content, both the genuine and altered multimedia content using respective first and second type of artificial intelligence systems, the recreating performed until respective reconstruction errors meet respective tolerance thresholds.

20. The apparatus of claim 17, wherein the one or more processors, in response to retrieval and execution of the computer-readable code, further cause the apparatus to perform operations comprising:
dissecting, after the reconstruction, internal layer outputs of the first and second trained artificial intelligence models to determine which components of the models to use to create respective difference vectors, wherein the components comprise one or more of nodes or layers in respective models;
comparing first and second difference vectors for the components in the respective first and second trained artificial intelligence models for genuine and altered multimedia content; and
deriving a set of classifiers from the first and second difference vectors based on the genuine and altered multimedia content.

21. A computer program product comprising a computer readable storage medium having program instructions embodied therewith, the program instructions executable by an apparatus to cause the apparatus to perform at least the following:
testing multiple trained artificial intelligence models using known genuine samples of respective multiple modalities of multimedia to generate versions of the multiple modalities of a given multimedia sample, wherein data for the multimedia and the multimedia sample are divided into the multiple modalities;
computing, based on the testing, respective differences between respective components of the multiple trained artificial intelligence models to produce respective multiple difference vectors;
comparing the respective multiple difference vectors with corresponding baseline difference vectors determined in order to train the multiple trained artificial intelligence models; and
classifying the given multimedia sample as genuine or altered using at least the comparison.

* * * * *